April 17, 1928.                                                    1,666,192
J. E. BOLLING
THERMOSTAT
Filed May 21, 1925
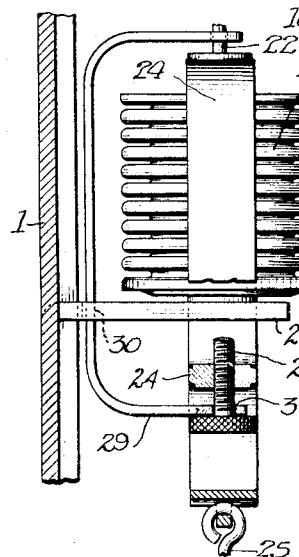
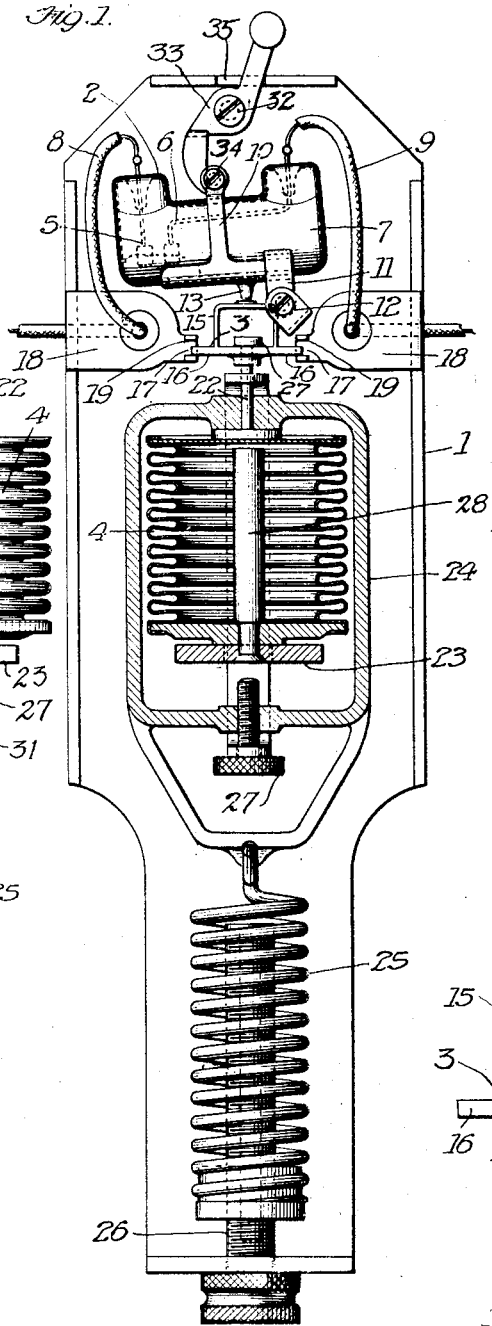
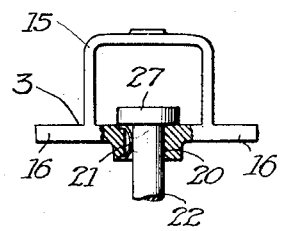
Witness
Martin H. Olsen.
Inventor
John E. Bolling,
By Kummler & Kummler,
Attys.

Patented Apr. 17, 1928.

1,666,192

UNITED STATES PATENT OFFICE.

JOHN E. BOLLING, OF CHICAGO, ILLINOIS, ASSIGNOR TO DRYING SYSTEMS, INC., OF CHICAGO, ILLINOIS, A CORPORATION OF ILLINOIS.

THERMOSTAT.

Application filed May 21, 1925. Serial No. 31,826.

This invention relates to thermostatic means for regulating temperatures within rooms, kilns, or other enclosures, and particularly to thermostats for controlling the operation of domestic heating systems, using either solid or liquid fuel; or thermostats controlling the dampers, valves, etc. of a heating or refrigerating apparatus.

In heating an enclosure by any thermostatically controlled means, such as the heating of a living room by means of a thermostatically controlled oil burner firing a hot water heater located in the basement, there is an appreciable interval between the time at which the burner is automatically placed in operation, and the time at which the room receives heat from the circulating water in the radiator. This interval is due to the time required; first, for the oil burner to transmit heat to the water in the heater; secondly for such water, by reason of such heat head, to circulate through the piping to the room radiators; and thirdly for the heat of the water to be transferred to the room by radiation and convection from the radiators. The time interval will, of course, vary in different installations, depending upon the design and proportions thereof, and with different heating systems; warmed air, hot water, steam or vapor; but the time interval is appreciable in any system.

Hence, in an automatically controlled system, if the thermostat be of such design that it actuates at one fixed temperature only, such an instrument will place the heating system in operation, namely, start an oil burner, open the drafts of a coal furnace when the room temperature falls to that for which the instrument is set. Then, during the cyclic interval of delay, as explained above, the room temperature will continue to fall until the room receives heat as described. The interval of delay is, in nearly all cases, great enough to permit a considerable fall in the room temperature.

In the same system, with the same type of thermostat, when the heating system has been in operation long enough to cause effective circulation of the heating medium— steam, water, or air—the room temperature begins to rise. When the room has reached the temperature for which the thermostat is set the instrument shuts down the system, but the residual heat within the system causes a further circulation of the heating medium, and the room temperature will rise above that at which the thermostat functioned. This rise in room temperature, due to the residual heat of the system will, also, vary in different installations and with different types of heating systems, but it is sufficient to cause an appreciable increase in room temperature above that desired, that is, the temperature for which the controlling thermostat is set.

The fall in room temperature below that desired, due to the interval of delay after the system is made operative; and the rise in room temperature above that desired, due to the residual heat of the system, after the system is made inoperative, or shut down; are particularly important factors in heating systems utilizing liquid fuel burners, since these burners are usually adapted to be operated at full capacity (permanently adjusted in accordance with the given installation), and then to become entirely inoperative. Because of this, the circulation of the heating medium, after the burner is extinguished, or stopped, practically ceases, and a considerable portion, if not all, of the heat head of the system is lost. When the burner again becomes operative, a considerable interval of delay occurs while the heat head is being restored and circulation reestablished. Room thermostats of the present common type are therefore particularly ineffective in liquid fuel burning heating systems.

Such thermostats are, however, ineffective in various degrees, in any heating or cooling system (temperature controlling or regulating system) for the reasons brought forth.

In a dry kiln heated by means of steam, there is also a fall in temperature during the time steam is being admitted to the heaters, and a rise in temperature after the steam supply is thermostatically shut off. A closely fixed temperature is of great importance in many drying operations, particularly where a chemical reaction is being effected in the material under treatment.

The main objects of this invention are to provide an improved form of thermostat which will automatically and constantly compensate for the characteristic fall in temperature due to the interval of delay, or the rise in temperature due to the residual heat effect, of any temperature regulating system, and which will, therefore, more closely regulate the temperature than can be accomplished by thermostats heretofore in use; to provide a thermostat which is operable between adjustable limits, automatically resetting its adjustment between these limits; to provide a thermostat of this kind having an improved construction and arrangement of parts whereby the instrument finally "hunts" within a very small range of temperature between the adjusted limits; and to provide a thermostatic control having an improved switch or valve operating mechanism which becomes effective to close the switch immediately upon any drop of temperature within the adjustable limits of the thermostat, and which is effective to immediately open the switch upon any rise of temperature within these limits.

An illustrative embodiment of this invention is shown in the accompanying drawings, wherein—

Fig. 1 is a central vertical section, partly in elevation, of a regulator to which this invention is applied.

Fig. 2 is an enlarged detail, partly in section, of the friction coupling and switch operating means.

Fig. 3 is a detail, partly in section and partly in elevation, of the bellows and the yoke supported thereon.

In the specific construction herein shown, the regulator includes expansion means of the bellows type and an electric switch of the mercury type mounted within a casing and relatively arranged so that the expansion of the bellows, upon a rise of the room temperature, imparts movement to a head frictionally connected thereto and arranged to rock the switch to its open position. The switch is arranged to drop by its own weight to closed position when the head is retracted upon the contraction of the bellows. Improved mechanism is also provided for manually controlling the two limits between which the expansion means operates, and whereby the instrument may be readily set for operation within any desired range of room temperature. Means is provided for manually opening the switch and retaining it in its open position independently of the expansion motor so as to permit the heating system to be readily shut off at night or whenever desired.

Although the specific construction herein illustrated embodies an electrical control, the invention is equally applicable to other types of thermostats, such as those wherein the controls are operated mechanically, pneumatically, or hydraulically.

In the embodiment herein illustrated, the improved regulator comprises a housing 1, in the upper part of which is located an electric switch 2, arranged to be operated by a head 3 which is frictionally connected to expansion means 4.

The switch 2 is preferably of the mercury type, having contacts 5 and 6 housed within a glass tube 7 and connected to conductors 8 and 9 respectively. Embracing the tube 7, is a metal clip or saddle 10 having a projecting part 11 which is pivotally connected to a bracket 12 fixed on the housing 1. The switch is arranged to normally occupy the position shown in Fig. 1, so as to close the contacts 5 and 6 by the globule of mercury which runs to the lower end of the glass tube 7. Formed on the lower part of the saddle 10, is a teat 13 which rests on the operating head 3.

The operating head 3 comprises an inverted U-shaped part 15 having outwardly projecting arms 16 which coact with guideways 17 formed at the extremities of ears 18 which extend inwardly from the side walls of the housing 1. Shoulders 19 at the ends of the guideways 17 limit the vertical movement of the head 3. Formed in the operating head 3, is a centrally located opening 20 in which is seated a spring 21 adapted to frictionally engage a plunger 22 of the expansion means.

The expansion means 4 is of the bellows type and is rigidly secured at its lower end to a bracket 23 fixed on the housing 1. Carried by the bellows, is a vertically movable yoke 24, which is connected at its lower end to a coiled spring 25, the tension of which may be varied by the usual adjusting screw 26, mounted in the lower end of the housing 1. Threaded in the lower end of the yoke 24, is a stud 27 which is adapted to coact with the lower face of the fixed bracket 23 for the purpose of limiting the upward movement of the yoke 24 and bellows 4. To secure the bellows 4 against collapsing under the weight of the yoke 24 and the action of the spring 25, a vertically disposed post 28 is mounted on the fixed bracket 23, and is arranged within the bellows so as to be adapted to support the entire weight of the yoke when the pressure of the gas within the bellows falls below a predetermined amount.

The plunger 22 is fixedly supported in the upper end of the yoke 24 and extends through the opening 20 of the head 3. The frictional contact between the spring 21 and the plunger 22 causes the head 3 to move up and down under the action of the bellows and, when the head 3 is stopped by the shoulders 19, the plunger is permitted to continue its movement independently of the head and switch. The plunger 22 is provided with an integral head 22.1. When the bellows yoke 24 moves downwardly the head 22.1 contacts with the member 3 and moves the same downwardly in case the frictional connection has failed. By this means the control switch is positively set in the "on" position at low temperatures.

Arranged at substantially right angles to the yoke 24, is a second yoke 29 which extends through a slot 30 formed in the bracket 28. Formed in the lower end of the yoke 29, is an aperture 31 which loosely engages the stud 27 so that the yoke rests upon the head of the stud, whereby the yoke 29 is carried upwardly by the yoke 24 during the expansion of the bellows 4. The upper end of the yoke 29 loosely embraces the plunger 22 and is arranged so as to positively lift the head 3 for opening the switch 2, in the event that the friction coupling fails to connect the head and plunger 22. The yoke 29 would thus serve in an emergency to positively open the switch so as to prevent overheating of the system.

Pivotally mounted on a pin 32 in the upper part of the housing 1, is a lever 33 having its lower end arranged to coact with a pin 34 at the top of the saddle 10 for the purpose of rocking the switch upwardly around its pivot when it is desired to manually open the switch. The upper end of the lever 33 forms a convenient handle which projects through a slot 35 in the upper end of the housing 1.

In operation, the spring 25 and stud 27 provide the adjustable means for regulating the range of the instrument. The former regulates the lowest limit of the range, and the latter controls the highest limit. For example, the bellows 4 and yoke 24 do not begin to move upwardly until a rise of the room temperature has caused sufficient pressure within the bellows to overcome the tension of the spring 25. The spring 25 is, therefore, initially adjusted so that, at a predetermined room temperature, its tension will be overcome and the yoke 24 and plunger 22 will be permitted to rise so as to lift the head 3, which rocks the switch to the "off" position. The spring is adjusted so as to permit the switch to be opened at a temperature a few degrees below the room temperature which it is desired to normally maintain.

For example, in an oil fired hot water heating system installed in a residence, a controlling thermostat is located in a living room and so arranged as to start and stop the burner, and it is desired to hold the room temperature at 70° F. By observation it is determined that the residual heat effect of the system will cause the room temperature to rise four degrees Fahrenheit after the burner is stopped, the observation being made under conditions of maximum load which occurs at the lowest average outdoor temperature. Then, if the burner is started when the system is cold and allowed to run until the room temperature reached sixty-six degrees Fahrenheit, and then the burner is stopped, the room temperature, due to the residual heat effect, will rise to the desired seventy degrees. The thermostat setting of sixty-six degrees will be hereinafter referred to as the "low" setting.

If the thermostat were of the types now in use, the burner would then remain inoperative until the room temperature has fallen to sixty-six degrees, the thermostat setting. But with this improved form of thermostat the "low" setting is adjustable to the desired sixty-six degrees, by means of the spring 25, and by means of the friction clutch the thermostat will at once start the oil burner upon any fall in room temperature below the high limit. If the room temperature rises to seventy degrees and then immediately begins to fall, the thermostat will at once start the burner. The interval of delay will be very short because the thermostat will start the burner the moment there is a fall in room temperature, say from seventy degrees to sixty-nine and one-half degrees (assuming sensitivity of the thermostat to be one-half degree), and the heating system will therefore have sustained but a slight loss of heat head. The room temperature will continue to fall, but very slightly, say, in very cold weather, about one and one-half degrees more, to sixty-eight degrees, because the interval of delay is shortened by the prompt action of the thermostat at the instant the temperature begins to fall. The room temperature then falls only to sixty-eight degrees before the system is again transmitting heat to the room, and when the room temperature begins to rise, at sixty-eight and one-half degrees the thermostat will stop the burner, but because of the prompt response of the thermostat the system will have accumulated but little excess heat and the rise in temperature due to residual heat will be but one or two degrees. Hence the room temperature will rise to sixty-nine degrees or seventy degrees.

On the next cycle the fall in temperature will be slightly less, and the rise in temperature will also be correspondingly less. The instrument will then "hunt" between two temperatures very close together, the room temperature being maintained with very slight variation, due to the compensating action of the thermostat. The room temperature would not again fall to the "low" setting of the thermostat, (sixty-six degrees) unless the system were placed on another control, or another adjustment of the same control, for the purpose of maintaining a lower temperature during the night or other desired periods. If a second lower control range is employed, then, whenever the normal range is restored, the thermostat will again function at the predetermined "low" setting and quickly balance the heating effect against the load on the system, as described. Obviously, when the load on the system is greatest, namely, when the outdoor temperature is lowest, the thermostat will function oftener, but will maintain the desired temperature within very slight variations.

In a residential heating system, where the load is determined principally by the outdoor temperature, the residual heat of the system will cause a greater rise in room temperature on days when the outside temperature is but a few degrees below the desired room temperature, than on days when the outside temperature is very low. Because of this the room temperature, on such warmer days, may rise slightly above the desired seventy degrees, due to the residual heat effect. There must be, therefore, a "high" setting of the thermostat, to prevent successive increments of temperature increase above the desired seventy degrees, else the room temperature, on warmer days, might become excessive, due to the cumulative action of the thermostat. The "high" setting is therefore provided as a separate adjustment, distinct from and independent of the "low" setting. The "high" setting is, of course, the same as the room temperature desired. In the example quoted, the "high" setting would be seventy degrees. The "high" setting limits the "hunting" action of the instrument. If the room temperature rises above the "high" setting, then the motion of the friction clutch plunger 22 is stopped at seventy degrees, when the stud 27 engages the fixed bracket 23, and the plunger will not again move to operate the thermostat until the room temperature has fallen below the "high" setting. Thus the action of the thermostat cannot have a cumulative effect, causing the room temperature to materially exceed that desired.

It should be observed that during warmer weather, when the temperature differential between the room and the outdoors is small, the hunting action of the thermostat is but slightly less effective although the variation may occur above the room temperature desired, whereas, in normal cold weather the variation will occur below the desired room temperature.

The compensating thermostat described in this application accomplishes its effect by constantly and automatically resetting itself between a "high" and "low" setting, the "high" setting being the temperature it is desired to maintain; the "low" setting being determined by the characteristic of the heating system involved, as described. The compensating thermostat herein described is as applicable to industrial requirements, such as dry kiln temperature control, process temperature control or control of temperature in air conditioning, whether heating or refrigeration is employed.

Although but one specific embodiment of this invention has been herein shown and described, it will be understood that numerous details of the construction shown may be altered or omitted without departing from the spirit of this invention as defined by the following claims.

I claim:

1. In a device of the class described, the combination with control means for temperature regulating equipment, of a support, an expansion element on said support, a yoke carried by said expansion element so as to be actuated thereby, a spring arranged to resist expansion of said element, and a stop for limiting the expansion of said element, said spring and stop being adjustable for varying the range of movement of said element, said element being arranged to immediately actuate said control means upon a reversal in the direction of movement of said element.

2. In a device of the class described, the combination with a control mechanism for a heat regulating system, said mechanism including an operating element, of a support, shoulders on said support for limiting the movement of said operating element, expansion means on said support and frictionally engaging said element, and adjustable means for limiting the range of movement of said expansion means, said expansion means being arranged to actuate said element immediately upon a reversal in the direction of movement of said expansion means and being adapted to continue its movement irrespective of said element after the latter has been actuated and is stopped by said shoulders.

3. In a device of the class described, the combination with a control mechanism for a heat regulating system, said mechanism including an operating element, of a support, shoulders on said support for limiting the movement of said operating element, an expansion bellows on said support, a yoke carried by said bellows so as to be actuated thereby, a spring arranged to resist the expansion of said bellows, an adjustable stop arranged to limit said expansion, and a part on said bellows frictionally engaging said element whereby said element is actuated immediately upon any reversal in the direction of movement of said bellows.

4. In a device of the class described, the combination with a control mechanism for a heat regulating system, said mechanism including an operating element, of a support, shoulders on said support for limiting the movement of said operating element, an expansion bellows on said support, a yoke carried by said bellows so as to be actuated thereby, a spring arranged to resist the expansion of said bellows, a stop adjustably mounted on said support for positively limiting the expansion of said bellows, and a part on said bellows frictionally engaging said element whereby said element is actuated immediately upon any reversal in the direction of movement of said bellows.

5. In a device of the class described, a housing, an electric switch mounted thereon, a head arranged to operate said switch, coacting shoulders on said housing and head for limiting the movement of the latter, expansion means in said housing, and a part on said means frictionally engaging said head for moving the latter to operate said switch, said part being adapted to continue its movement independently of said head after the latter has been stopped by the coaction of said shoulders.

6. In a device of the class described, a housing, an electric switch mounted thereon, a head arranged to operate said switch and having an opening therein, a spring seated in said opening, expansion means on said housing, and a part on said motor projecting through said opening and frictionally engaging said spring for moving said head, said part being adapted to continue its movement independently of said head after the switch has been operated.

7. In a device of the class described, a housing, a mercury switch pivotally mounted in said housing, a head arranged to rock said switch to open position and having an opening therein, a spring seated in said opening to form a friction element, expansion means in said housing, and a part on said means projecting through said opening and frictionally engaging said spring for moving said head said part being adapted to continue its movement independently of said head after the switch has been opened.

8. In a device of the class described, a housing, a mercury switch pivotally mounted in said housing, a saddle embracing said switch, a head coacting with said saddle for opening said switch, thermostatic means arranged to actuate said head, and a lever coacting with said saddle for manually opening said switch and retaining it in its open position independently of said thermostatic means.

9. In a device of the class described, the combination with a control mechanism for a heat regulating system, said mechanism including an operating element, of a support, expansion means on said support and frictionally engaging said element, adjustable means for limiting the range of movement of said expansion means, and an adjustable member on said expansion means adapted to positively engage said element when said expansion means reaches a predetermined position.

Signed at Chicago this 18 day of May, 1925.

JOHN E. BOLLING.